United States Patent [19]

Jansen

[11] Patent Number: 4,473,925
[45] Date of Patent: Oct. 2, 1984

[54] BAND CLAMP
[75] Inventor: George A. Jansen, Denver, Colo.
[73] Assignee: Houdaille Industries, Inc., Fort Lauderdale, Fla.
[21] Appl. No.: 397,430
[22] Filed: Jul. 12, 1982
[51] Int. Cl.³ .............................................. B65D 63/06
[52] U.S. Cl. ................................................... 24/23 W
[58] Field of Search ............. 24/23 W, 20 CW, 20 W, 24/243 R

[56] References Cited
U.S. PATENT DOCUMENTS

| 2,053,739 | 9/1936 | Prindle | 24/23 W |
| 2,231,712 | 2/1941 | Gleason | 24/23 W |
| 2,269,285 | 1/1942 | Ott | 24/23 W |
| 2,273,007 | 2/1942 | Cooper | 24/23 W |
| 3,015,865 | 1/1962 | Rapuzzi | 24/23 W |
| 3,067,640 | 12/1962 | Lodholm | 24/23 W |
| 3,754,303 | 8/1973 | Pollock | 24/23 W |
| 3,833,969 | 9/1974 | Hollingsworth et al. | 24/23 W |

Primary Examiner—Mickey Yu

[57] ABSTRACT

A clamp is provided which includes a buckle of high strength material with top, bottom, and side walls defining a rectangular passage. An elongate band is anchored at one end to the buckle and wrapped on itself and passed through the buckle at least twice to define a clamp structure for securing a hose on a conduit.

The top wall of the buckle has two integral but discrete locking tabs centrally located and adapted to be bent down about their lines of juncture with the top wall. A chisel-tipped punch is driven radially inward between the free ends of the tabs to force them into the adjacent layer of the band, causing band metal to flow and produce upset interlocks between the band and the tabs outward of the tabs. The ends of the tabs also cause band metal to flow into a bulge between the tabs. The punch tip divides the bulge and flows the metal toward the tab ends to produce a second pair of upset interlocks between the band and the tabs.

The inward movement of the punch and tabs also forms dimples in the layers of the band and these dimples are depressed into an aperture formed in the bottom wall of the buckle, thus producing a second lock against slippage of the band under high tension. The high strength of the tabs prevents the dimples from flattening out and thus preserves their locking ability.

8 Claims, 6 Drawing Figures

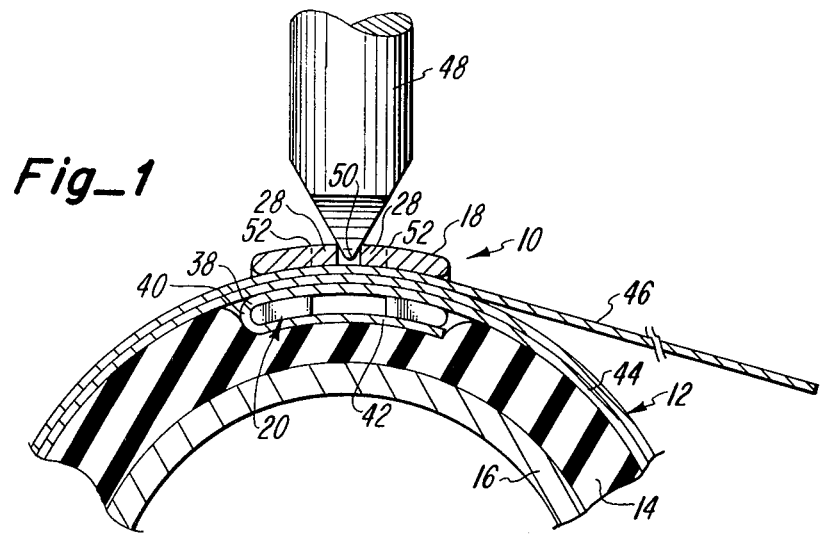
Fig_1
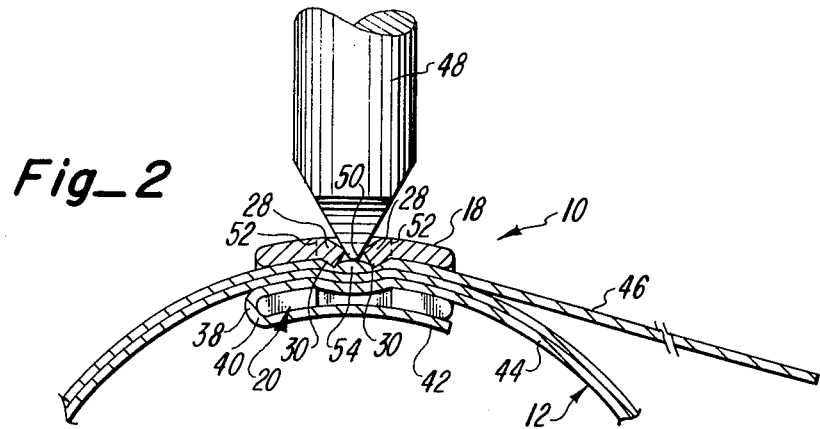
Fig_2
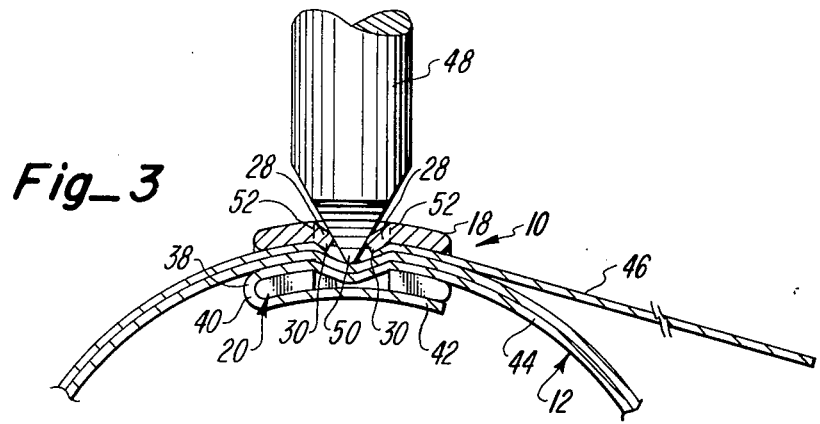
Fig_3

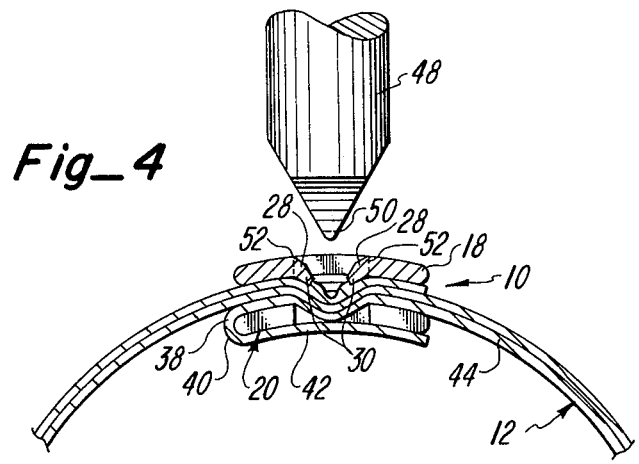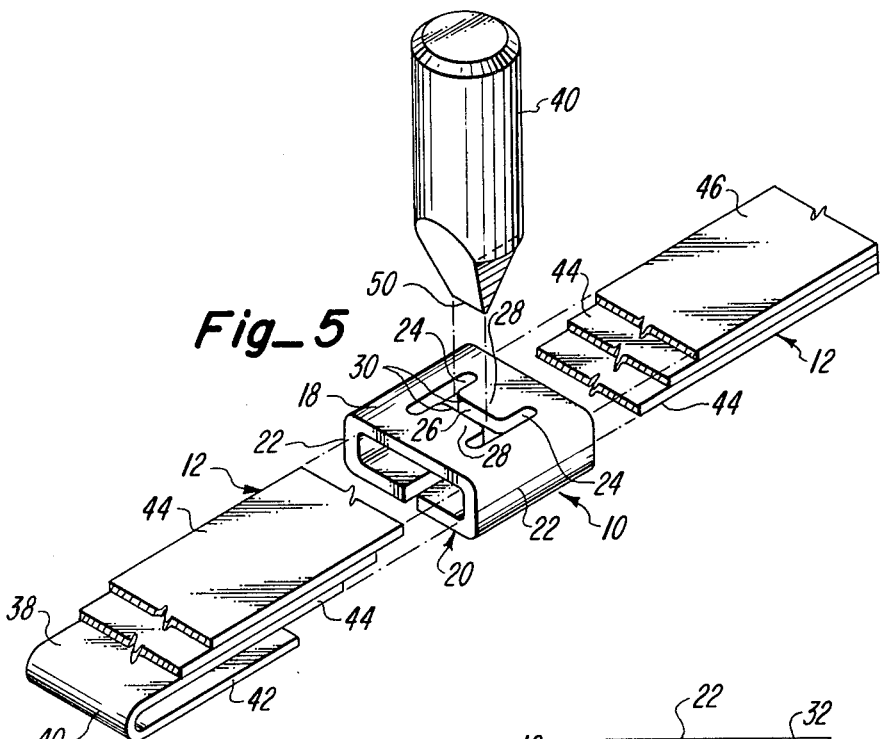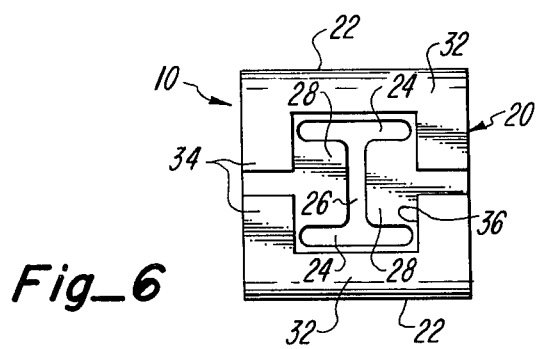

BAND CLAMP

TECHNICAL FIELD

This invention relates to a clamp for very tightly securing a hose or the like to a conduit, which is usually rigid, which clamp will maintain the desired tightness during its entire period of use. The clamp is of the type which includes a buckle and an elongate band having one end secured thereto, looped around the article to be clamped, and then secured to the buckle while subject to a high tension load.

BACKGROUND ART

Many different types of clamps have been tried for the purpose mentioned with varying degrees of success. A common type which is used in low and medium pressure applications generally consists of a single length of band material to surround the article to be clamped, equipped with radially outwardly extending ears and a bolt and nut connection between the ears to pull them together. A tongue attached to one end underlies the other end to close the gap between them. This type is not satisfactory for high pressure applications because the bolt load will pull the ears together and bend them out of shape before the desired tension is achieved in the band. Moreover, the outwardly extending ears are inconvenient and hazardous under many conditions of use.

To overcome these disadvantages another type of clamp was developed using a buckle having top, bottom, and side walls providing a generally rectangular longitudinal passage therethrough. A band was provided having a first end portion anchored to the buckle, an intermediate portion wrapped on itself in spiral fashion with two or more layers extending through the passage to form a generally circular structure surrounding the body to be clamped, and a second end portion extending generally tangentially from the buckle. A tightening tool was then set to thrust against the buckle and grip the second end portion, pulling it through the buckle until the desired tension was produced. The tool was then swung in a direction to bend the end portion upward in front of the near edge of the buckle while maintaining the tension in the band, after which the excess material was sheared or broken off. The upturned remainder was thus anchored against the buckle to maintain the tension and there was no structure extending outward of the buckle to interfere with handling operations. However, since the anchorage was only the bent end of the band it frequently flattened out under the high tension and the band slipped through the buckle, losing all its gripping power.

An effort to improve the clamp just described is disclosed in U.S. Pat. No. 3,833,969 to Hollingsworth. In this patent Hollingsworth uses a very similar basic structure but changes the type of locking means. He forms registering apertures in the top and bottom walls of the buckle and also an aperture in the intermediate portion of the band near its anchorage to the buckle and also in registry with the aperture in the bottom wall of the buckle. After the band is pulled to the desired tension in the same manner as described above he places the point of a center punch in the aperture in the top wall and strikes the punch one or more times with a mallet. The force of the blows deforms the intermediate layers of the band into a plurality of inwardly extending dimples nesting with each other and extending partly into the aligned apertures in the first layer of the band and the bottom wall of the buckle. Their interference with the apertures and with each other serve as a lock against slippage and represent a considerable improvement over the type previously described. However the cam surface effect still allows initial slippage in use at levels lower than desired, particularly because the dimple of the outermost layer tends to flatten and slide out of the next dimple.

The U.S. Pat. No. 3,754,303 to Pollock shows a similar construction in which the buckle is made of a much heavier gauge material than the band, and is relatively very rigid. In this patent an integral area in the top wall is made much thinner than the balance of the buckle, partially segregated by narrow slots to allow deformation and partially connected by short webs. When the band is tightened in the same way as previously described a punch is applied to the center of the thinned area and driven inward by mallet blows. The force of the punch forms a dimple in the thinned section and in each of the underlying layers of the band with the lowermost dimple entering into an aperture in the bottom wall of the buckle. The final result is about the same as in Hollingsworth but the location of the dimpled thinned area, which is integral with the buckle, in the nested dimples probably increases the resistance in initial slippage to a substantial degree. Nevertheless, the cam surface relation of all of the elements makes them quite susceptible to slippage under high tension.

DISCLOSURE OF THE INVENTION

In accordance with this invention, a band type clamp is provided which is particularly suited to secure a hose or the like to a conduit under high compression. It includes a buckle and a band which is anchored to the buckle and formed in a loop to surround a hose and be tightly secured thereon.

The buckle is made of high strength material and has top, bottom, and side walls formed to provide a generally rectangular passage therethrough.

The band is made of relatively flexible or bendable material and is of a width closely corresponding to the width of the passage through the buckle. It has a first end portion provided with an anchorage for engagement with the buckle to resist tension loads, an intermediate portion which is adapted to extend through the passage in the buckle at least twice and overlap itself in spiral fashion to form an encircling structure to surround the object to be clamped, and a second end portion which extends out of the buckle tangentially to be gripped and pulled by a tightening tool lodged against the buckle to apply the desired tension in the band.

A primary locking means is formed in the top wall of the buckle to engage and restrain the intermediate portion of the band in a zone adjacent to the second end portion. The locking means includes two slots through the top wall extending circumferentially of the buckle and the band and they are laterally spaced about one half of the width of the buckle. A third, cross slot joins the first two slots at about their midpoints.

The three slots form a letter H and cooperate to define between them a pair of locking tabs integral with the buckle body and extending circumferentially toward each other with their free ends in confronting spaced relation.

The tabs are bendable radially inward and circumferentially away from each other about their lines of juncture with the top wall when a chisel tipped punch is located with its tip between their confronting free ends and driven radially inwardly by one or more blows from a mallet. This action takes place while the tightening tool is still holding the band under high tension. As the tabs swing inward and away they contact the adjacent layer of the band and cause flowing of the metal in the layer to produce an upset interlock between the band and each of the tabs. The inward movement of the tabs also produces a bulge in the layer between the tabs. As the punch continues inward it divides the bulge and flows the metal to produce a second pair of upset interlocks between the layer and the tabs inward of the tabs. These positive abutments strongly resist any circumferential movement of the outer layer of the band in the buckle. The force to make the band slip is the force necessary to make the metal in the abutments flow again and this is higher than the tension load for which the clamp is intended to be used. Consequently, slippage should not occur in any proper installation.

Secondary locking means are formed in the bottom wall of the buckle comprising an aperture through the wall. When the punch deforms the tabs and the outer layer of the band as above described it also forms inwardly extending dimples in the underlying layers, and these dimples are driven partly into the aperture to produce considerable resistance to slippage in the same way as prior art devices. However the locking is superior because the deformation of the outer layer of the band is held firmly in the dimples by the relatively rigid tabs so that the underlying layers are clamped from above and below, and it is extremely difficult for them to flatten out and slip through the buckle. The aperture in the bottom wall is preferably generally rectangular to better accommodate the shape of the dimples produced by the chisel-tipped punch.

Various other advantages and features of novelty will become apparent as the description proceeds in conjunction with the accompanying drawings.

BRIEF DESCRIPTION OF THE DRAWINGS

FIG. 1 is a fragmentary sectional view in elevation of the clamp in place on a hose and conduit with the punch in striking position;

FIG. 2 is a view similar to FIG. 1 with some of the elements partially deformed by the action of the punch;

FIG. 3 is a view similar to FIG. 2 with the elements fully deformed by the action of the punch;

FIG. 4 is a view similar to FIG. 3 with the punch removed and the tail of the band severed;

FIG. 5 is an exploded perspective view of the elements of the clamp in working relation with the punch about to be applied; and FIG. 6 is a bottom plan view of the buckle.

DESCRIPTION OF THE PREFERRED EMBODIMENT

The clamp of the invention in assembled relation around a hose mounted on a conduit and with a punch in operative position is illustrated in FIG. 1, in which the clamp basically consists of a buckle 10 and an elongate band 12. The band is wrapped on itself in spiral fashion to form a loop surrounding hose 14 which in turn is mounted on conduit 16 and is to be clamped tightly thereon in leak proof relation.

With reference also to FIGS. 5 and 6, the buckle 10 consists of a top wall 18, a bottom wall 20, and side walls 22 formed to define a generally rectangular passage extending circumferentially of the band and buckle assembly. The upper wall is pierced by two slots 24 extending circumferentially and parallel to each other and spaced apart about one half of the width of the buckle. A third slot 26 extends laterally between the first slots and intersects them at about their mid-points to form a letter H which in turn defines two locking tabs 28 which are integral with the top wall and extend circumferentially toward each other with their free ends 30 in confronting spaced relation across slot 26. The bottom wall 20 consists of two flat segments 32 extending toward each other with their free edges 34 very close to each other or in contact. A portion is cut out of each segment to define a generally rectangular aperture 36 whose dimensions in plan form are at least about equal to those of the H-shaped slots in the top wall for a purpose to be described later.

The band 12 includes a first end portion 38 provided with a hook-like anchorage 40 defined by a lip wrap or re-bent section 42 which engages the edges of segments 32 of the bottom wall. The intermediate portion 44 of the band extends through the passage in the buckle and is wrapped on itself in spiral fashion, going through the passage with each turn to produce a generally annular or circular structure which surrounds hose 14, with the second end portion or tail 46 exiting from the buckle tangentially. Since a clamp of this kind is intended to exert a very high clamping pressure it is desirable to pass at least two lengths of layers of the band through the buckle in addition to the portion adjacent to the anchorage.

With the band and buckle in place as shown in FIG. 1, a tightening tool is applied to produce the desired tension in the band. Various tools are known in the art and operate in the same general way. A typical tool has a base member which lodges against the buckle and a gripper member which grips the protruding tail of the strap. The gripper is then forced away from the base member to pull the strap through the buckle until the desired tension is reached. This is the condition illustrated in FIG. 1 and is maintained while the locking operation is performed.

A punch 48 with a chisel tip 50 is provided to accomplish the deforming operation which produces the locking effect. The punch is arranged in radially inwardly extending position with tip 50 located in the cross slot 26. When the punch is struck by a mallet, the tip 50 enters between tabs 28 and forces their inner ends 30 radially inward and circumferentially away from each other as seen in FIG. 2, with the tabs bending about their lines of juncture 52 with the top wall. It will be seen that their free ends 30 bite into the adjacent outermost layer of the band and cause the metal to flow circumferentially in both directions, building up a bulge 54 between the tabs, and tip 50 engages the bulge.

As the movement of the punch continues under the force of the mallet blow, as seen in FIG. 3, the tab ends 30 continue to flow the metal of the band to produce an abutment or upset interlock between the band and each of the tabs outward of the tabs. In their final position the tabs 28 extend inward at an angle of the order of 45 to 60 degrees to their original position. At the same time, the tip of the punch penetrates bulge 54 and divides it, causing the metal of the band to flow circumferentially toward the ends 30 of tabs 28. This flow produces a second pair of abutments or upset interlocks between the band and tabs 28. These interlocks are of such nature that slippage of the band in the buckle can be caused only by a force as great as that applied in producing the interlocks because the metal must flow out of the way to allow movement of the band. The force required is substantially greater than that called for in normal service use of the clamp.

While the tabs are being interlocked with the outer band, the force of both tabs and the punch drive dimples radially into all layers of the band, the lowermost dimples entering into aperture 36 in the bottom wall. Thus the band is locked by the dimples and the aperture as well as in prior art clamps. In fact the locking is even more secure because the high strength tabs 28 prevent the dimples from flattening out to their original shape.

The combination of the chisel tip on the punch and the shape of the tabs produces generally rectangular dimples in the layers of the band, and therefore the rectangular shape of recess 36 in the bottom wall is ideally suited to accommodate them.

When the locking operation has been completed, the tightening tool is operated in known manner to break or shear off the second end portion or tail 46 of the band at the edge of the buckle, as seen in FIG. 4, and thus there are no protruding elements to interfere with handling of the joint. With the punch removed, FIG. 4 shows clearly the very positive interlock between buckle and band produced by the use of the present invention.

The invention has been described in detail with particular reference to preferred embodiments thereof, but it will be understood that variations and modifications can be effected within the spirit and scope of the invention.

What is claimed is:

1. A clamp adapted for use in securing a hose or the like object to a conduit under high compression, comprising:
   a buckle of high strength material having top, bottom, and side walls formed to provide a generally rectangular passage therethrough, said passage having a length, width and height;
   an elongated flexible band of a width closely corresponding to said width of the passage through the buckle having a first end portion provided with an anchorage for engagement with the buckle to resist tension loads, an intermediate portion adapted to extend through the passage in the buckle at least twice and overlap itself to form an encircling figure to surround the like object to be clamped, said band and said buckle when in assembled position extending generally in a circumferential direction, and a second end portion adapted to be gripped and pulled by a tightening tool lodged against the buckle to apply the desired tension in the band;
   primary locking means formed in the top wall of the buckle to engage and restrain the intermediate portion of the band in a zone adjacent to the second end portion;
   the locking means including two slots through the top wall extending circumferentially of the buckle and band and being laterally spaced about one half of said width of the buckle, and a cross slot joining the first two slots at about their mid-points;
   the three slots cooperating to define between them a pair of locking tabs integral with the buckle body and extending circumferentially toward each other with their free ends having a linear extent and being in confronting spaced relation;
   each of said tabs having an edge formed at the junction of the surface of one of said free ends and the bottom surface of said tab, each of said edges having a linear extent corresponding to said linear extent of said free ends;
   the tabs being bendable radially inward and circumferentially away from each other about their lines of juncture with the top wall in response to the radial inward drive of a punch to move said edges into engagement with the adjacent layer of the band and to cause flowing of the metal in the adjacent layer of the band and produce upset interlocks between the band and said free end of each of the tabs over said linear extent.
   and secondary locking means formed in the bottom wall of the buckle comprising an aperture therethrough to receive the linearly extending portions of the layers of the band driven inward by the force of the punch.

2. A clamp as claimed in claim 1; in which the aperture defining the secondary locking means directly underlies the primary locking means and is generally rectangular in planform.

3. A clamp as claimed in claim 2; in which the lateral and longitudinal dimensions of the aperture are at least substantially as great as those of the primary locking means.

4. A clamp adapted for use in securing a hose or the like object to a conduit under high compression, comprising:
   a buckle of high strength metal having top, bottom, and side walls formed to provide a generally rectangular passage therethrough said passage having a length, width and height;
   and an elongated flexible metal band having a first end portion provided with an anchorage engaging the buckle to resist tension loads, an intermediate portion extending through the buckle at least twice and overlapping itself to form an encircling structure to surround the article to be clamped, and a second end portion extending from the buckle, adapted to be gripped and pulled by a tightening tool lodged against the buckle to apply the desired tension in the band;
   registered apertures in the top and bottom walls of the buckle;
   the aperture in the top wall being occupied in part by a pair of tabs integral with the top wall and of the same thickness and strength, and extending circumferentially toward each other with their free ends in confronting spaced relation;
   said free ends having a predetermined length; each of said tabs having an edge formed at the junction of the surface of one of said free ends and the bottom surface of said tab, each of said edges having a predetermined length corresponding to said predetermined length of said free ends;
   the tabs being bendable radially inward and circumferentially away from each other about their lines of juncture with the top wall in response to a radial inward drive of a punch to move said edges into engagement with the adjacent layer of the band and to cooperate with the punch in forming radially inwardly directed nested indentations in the underlying layers of the band extending over said predetermined length;
   the aperture in the bottom wall being adapted to receive at least the lowermost indentations of the band so that all layers are locked against slippage;

and the tabs being of high strength metal to provide means to prevent the linearly extending indentations from riding out of the aperture, and thus reinforcing the locking function.

5. A clamp as claimed in claim 4; in which the tabs are adapted to be bent inward in cooperation with the inward movement of the punch to flow the metal of the adjacent layer of the band into a pair of upset interlocks between each of the tabs and the layer.

6. A clamp as claimed in claim 5; in which the tabs are adapted to be bent inward to angular positions of the order of 45 to 60 degrees to their original positions.

7. In a clamp assembly including a band and a buckle and in which the band includes a first end portion provided with an anchorage adapted to engage the buckle, an intermediate portion adapted to be received through the buckle for surrounding an object to be clamped, and a second end portion adapted to be gripped and pulled by a tightening tool in order to apply the desired tension in the band so that said band and said buckle extend generally in a circumferential direction, the improvement comprising:

a buckle having a top wall having an H-shaped opening extending therethrough;

said H-shaped opening comprising two spaced apart generally parallel slots extending circumferentially of the buckle and band joined by a cross slot extending between and opening into each of said two parallel slots so as to form a pair of tabs;

said tabs having free ends terminating at a predetermined location to form said cross slot;

said free ends having a predetermined length;

each of said tabs having an edge defined by the junction of the surface of one of said free ends and the bottom surface of said tab, each of said edges having a predetermined length corresponding to said predetermined length of said free ends; and said edges of said tabs being forced inwardly in response to a force exerted on each of said tabs over said predetermined length to force said edges into contact with and displace portions of the adjacent layer of said band over said predetermined length to minimize slippage of said band in each circumferential direction.

8. In a clamp assembly including a band and a buckle and in which the band includes a first end portion provided with an anchorage adapted to engage the buckle, an intermediate portion adapted to be received through the buckle for surrounding an object to be clamped, and a second end portion adapted to be gripped and pulled by a tightening tool in order to apply the desired tension in the band so that said band and said buckle extended generally in a circumferential direction, the improvement comprising:

a buckle having a top wall having an U-shaped opening extending therethrough;

said U-shaped opening comprising two spaced apart generally parallel slots extending circumferentially of the buckle and band joined by a cross slot extending between and opening into each of said two parallel slots so as to form a tab;

said tab having a free end terminating at a predetermined location to form said cross slot:

said free end having a predetermined length;

said tab having an edge defined by the junction of the surface of said free end and the bottom surface of said tab, said edge having a predetermined length corresponding to said predetermined length of said free end; and said edge of said tab being forced inwardly in response to a force exerted on said tab over said predetermined length to force said edge into contact with and displace portions of the adjacent layer of said band over said predetermined length to minimize slippage of said band in each circumferential direction.

* * * * *